United States Patent
Darshan et al.

(10) Patent No.: US 9,929,866 B2
(45) Date of Patent: Mar. 27, 2018

(54) POE FOUR PAIR ACTIVE DETECTION APPARATUS AND METHOD

(71) Applicant: Microsemi Corp.—Analog Mixed Signal Group, Ltd., Hod Hasharon (IL)

(72) Inventors: Yair Darshan, Petach Tikva (IL); Alon Ferentz, Petach Tikva (IL)

(73) Assignee: Microsemi P.O.E. Ltd., Hod Hasharon (IL)

(*) Notice: Subject to any disclaimer, the term of this patent is extended or adjusted under 35 U.S.C. 154(b) by 341 days.

(21) Appl. No.: 14/972,121

(22) Filed: Dec. 17, 2015

(65) Prior Publication Data

US 2016/0197734 A1 Jul. 7, 2016

Related U.S. Application Data

(60) Provisional application No. 62/100,568, filed on Jan. 7, 2015.

(51) Int. Cl.
*H04L 12/10* (2006.01)
*G06F 1/26* (2006.01)
*H04L 12/40* (2006.01)

(52) U.S. Cl.
CPC ............... *H04L 12/10* (2013.01); *G06F 1/26* (2013.01); *G06F 1/266* (2013.01); *H04L 12/40045* (2013.01)

(58) Field of Classification Search
CPC ... H04L 12/10; H04L 12/40045; H04L 49/40; G06F 1/26; G06F 1/266
See application file for complete search history.

(56) References Cited

U.S. PATENT DOCUMENTS

| | | | |
|---|---|---|---|
| 7,492,059 B2 | 2/2009 | Peker et al. | |
| 8,234,086 B2* | 7/2012 | Karam | H04L 12/10 702/117 |
| 9,209,981 B2* | 12/2015 | Heath | H04L 12/10 |
| 9,667,429 B2* | 5/2017 | Dwelley | H04L 12/10 |
| 2013/0113275 A1 | 5/2013 | Dwelley et al. | |

(Continued)

OTHER PUBLICATIONS

HDBaseT Specification Version 1.1.0, pp. 151-187, published by the HD dated Jul. 12, 2011.

(Continued)

*Primary Examiner* — Ryan Johnson
(74) *Attorney, Agent, or Firm* — Simon Kahn

(57) ABSTRACT

A power over Ethernet (PoE) connection check method comprising: for a first time period, generating a first detection power over the first set of wires while not generating a second detection power over the second set of wires and obtaining a first indication of a power attribute over the first set of wires; during a second time period, generating the first detection power and generating a second detection power, greater than the first detection power, over the first set of wires; during the second time period, obtaining a second indication of the power attribute over the first set of wires; determining a first difference between the first indication and the second indication; and controlling a first power enable circuit and a second power enable circuit to provide power to the powered device over the first and second sets of wires respectively, responsive to the determined difference.

16 Claims, 11 Drawing Sheets

(56) References Cited

U.S. PATENT DOCUMENTS

2013/0257161 A1 10/2013 Ferentz et al.

OTHER PUBLICATIONS

IEEE Std 802.3af-2003—Amendment: Data Terminal Equipment (DTE) Power via Media Dependent Interface; pp. 29-57, 94-96, 102 and 115; Published by The Institute of Electrical and Electronics Engineers, Inc., New York, NY, Jun. 18, 2003.
IEEE Std 802.3at-20093—Amendment 3: Data Terminal Equipment (DTE) Power via Media Dependent Interface Enhancements; pp. 22-67; Published by The Institute of Electrical and Electronics Engineers, Inc., New York, NY, Oct. 30, 2009.
International Search Report for PCT/IL2015/051226 dated Apr. 22, 2016 by the European Patent Office.
Written Opinion of the International Searching Authority for PCT/IL2015/051226 dated Apr. 22, 2016 by the European Patent Office.

* cited by examiner

POE FOUR PAIR ACTIVE DETECTION APPARATUS AND METHOD

BACKGROUND OF THE INVENTION

The invention relates generally to the field of power over local area networks, particularly Ethernet based networks, and more particularly to a method of detection and identification of the connection arrangement of a powered device receiving power over four twisted wire pairs.

Power over Ethernet (PoE), in accordance with both IEEE 802.3af-2003 and IEEE 802.3at-2009, each published by the Institute of Electrical and Electronics Engineers, Inc., New York, the entire contents of each of which is incorporated herein by reference, defines delivery of power over a set of 2 twisted wire pairs without disturbing data communication. The aforementioned standards particularly provide for a power sourcing equipment (PSE) and a powered device (PD). The power sourcing equipment is configured to detect the PD by ascertaining a valid signature resistance, and to supply power over the 2 twisted wire pairs only after a valid signature resistance is actually detected.

U.S. Pat. No. 7,492,059 issued Feb. 17, 2009 to Peker et al, the entire contents of which is incorporated herein by reference is addressed to powering a PD over 4 twisted wire pairs. Such a technique provides for increased power as compared to either of the above mentioned standards, and is commercially available from Microsemi Corporation of Alisa Viejo, Calif.

The HD BaseT Alliance of Beaverton Oreg. has published the HDBaseT Specification Version 1.1.0 which defines a high power standard utilizing twisted wire pair cabling, such as Category 5e (CAT 5e) or Category 6 (CAT 6) structured cabling as defined by ANSI/TIA/EIA-568-A. The specification provides for even higher power than the above mentioned IEEE 802.3at-2009 over each set of 2 pairs, with all 4 pairs utilized for powering, and allows for power over structured communication cabling from any of: a type 1 PSE, denoted hereinafter as a low power PSE, typically meeting the above mentioned IEEE 802.3af standard; a type 2 PSE denoted hereinafter as a medium power PSE, typically meeting the above mentioned IEEE 802.3at standard; a type 3 PSE, denoted hereinafter as a high power PSE, typically meeting the above specification; twin medium power PSEs; and twin high power PSEs.

Detection, in accordance with any of the above standards requires the supply of at least 2 voltage levels between the range of 2.8 volts and 10 volts, with a signature resistance of the PD determined based on a calculation of the actual voltage levels, or current, detected. The use of 2 voltage levels allows for determination of the signature resistance irrespective of the existence of a diode bridge, typically supplied at the input to the PD. The voltage levels may be impressed via either a current source, or a voltage source.

FIG. 1A illustrates a high level block diagram of a PoE powering arrangement 10, according to the prior art, comprising: a switch/hub 20; a plurality of twisted wire pairs 30 constituted within a structured cable 35; and a PD 40. Switch/hub 20 comprises a plurality of data transformers 50 and a first and a second PSE 60 and a master control 63. PD 40 comprises: a plurality of data transformers 50; a first and a second diode bridge 65; a PD interface 70; an electronically controlled switch 80; and a PD load circuitry 90. PD interface 70 comprises: an under-voltage lockout (UVLO) circuit 100; a signature impedance 110; and a class current source 120. Optionally, a class event counter is further supplied (not shown). As illustrated in FIG. 1B, PSE 60 comprises: a control circuitry 61; a sense resistive element, illustrated and described herein without limitation as a sense resistor RS; and a current limiter CL, illustrated and described herein without limitation as an n-channel metal-oxide-semiconductor field-effect-transistor (NMOSFET). Control circuitry 61 comprises: a detection functionality 62; a classification functionality 64; a powering functionality 66; and a maintain power signature (MPS) detection functionality 68, each of which may be constituted in a dedicated circuitry, or as a programmed functionality for a computing element, without limitation. Each control circuitry 61 is responsive to master control 63 (connection not shown). In one embodiment, a selected control circuitry 61 further acts as master control 63 and communicates commands to other associated control circuitries 61.

A data pair is connected across the primary winding of each data transformer 50 in switch/hub 20 and a first end of each twisted wire pair 30 is connected across the secondary winding of each data transformer 50 in switch/hub 20 via respective connections, listed conventionally in two groups: connections 1, 2, 3, 6, denoted ALT-A, where power is thus delivered over a first set of wires; and connections 4, 5, 7 and 8, denoted ALT-B, where power is thus delivered over a second set of wires. A first output of first PSE 60, representing the positive polarity, is coupled to the center taps of the secondary windings of data transformers 50 of switch/hub 20 connected to twisted wire pairs 30 via connections 1 and 2; and a return of first PSE 60, which as shown in FIG. 1B is associated with the drain of NMOSFET CL, is coupled to the center taps of the secondary windings of data transformers 50 of switch/hub 20 connected to twisted wire pairs 30 via connections 3 and 6. A first output of second PSE 60, representing the positive polarity, is coupled to the center taps of the secondary windings of data transformers 50 of switch/hub 20 connected to twisted wire pairs 30 via connections 4 and 5; and a return of second PSE 60, which as shown in FIG. 1B is associated with the drain of NMOSFET CL, is coupled to the center taps of the secondary windings of data transformers 50 of switch/hub 20 connected to twisted wire pairs 30 via connections 7 and 8. The powering arrangement associated with first PSE 60 is conventionally known as ALT-A powering, i.e. wherein powering is provided over the set of wire pairs associated with connections 1, 2, 3 and 6; and powering from second PSE 60 is conventionally known as ALT-B powering, i.e. wherein powering is provided over the set of wire pairs associated with connections 4, 5, 7 and 8.

The gate of NMOSFET CL is coupled to an output of control circuitry 61. The source of NMOSFET CL is coupled to a first end of sense resistor RS and a respective input of control circuitry 61. A second end of sense resistor RS is coupled to a respective input of control circuitry 61 and to a return line 130 coupled to a return of a power source (not shown). A power line 140, coupled to the power output of the power source (not shown) represents the positive polarity output of PSE 60. Structured cable 35 typically comprises 4 twisted wire pairs 30.

A data pair is connected across the primary winding of each data transformer 50 in PD 40 and a second end of each twisted wire pair 30 is connected across the secondary winding of each data transformer 50 in PD 40 via respective connections, listed conventionally in two groups: connections 1, 2, 3, 6; and connections 4, 5, 7 and 8. The inputs of first diode bridge 65 are respectively connected to the center taps of the secondary windings of data transformers 50 of PD 40 connected to twisted wire pairs 30 via connections 1, 2, 3 and 6. The inputs of second diode bridge 65 are respectively connected to the center taps of the secondary windings of data transformers 50 of PD 40 connected to twisted wire pairs 30 via connections 4, 5, 7 and 8. The positive outputs of first and second diode bridges 65 are commonly connected to the positive input of PD interface 70, and the returns of first and second diode bridges 65 are commonly connected to the return of PD interface 70. PD interface 70 is illustrated as having a pass through connection from the positive input to the positive output thereof, and power for each of UVLO circuit 100, signature impedance 110 and class current source 120 are provided there from (not shown). PD interface 70 is illustrated as having a pass through connection from the return input to the return output thereof, and a return for each of UVLO circuit 100, signature impedance 110 and class current source 120 are provided there from (not shown). Electronically controlled switch 80 is arranged to provide a switchable connection between the return of PD load circuitry 90 and the return of PD interface 70, and electronically controlled switch 80 is responsive to an output of UVLO circuit 100, indicative that received power is reliable and is denoted PG. The positive input of PD load circuitry 90 is connected to the positive output of PD interface 70.

Powering arrangement 10 has been illustrated in an embodiment wherein electronically controlled switch 80 is connected in the return path, however this is not meant to be limiting in any way and in another embodiment electronically controlled switch 80 is connected in the power path. Similarly, PSE 60 is illustrated as being part of switch/hub 20 however this is not meant to be limiting in any way, and midspan equipment may be utilized to provide a connection for PSE 60 without exceeding the scope. PSE 60 may be any equipment arranged to provide power over communication cabling, including equipment meeting the definition of a PSE under any of IEEE 802.3af; IEEE 802.3at; and the above mentioned HDBaseT specification, without limitation.

In operation, electronically controlled switch 80 is initially set to isolate PD load circuitry 90 from PSE 60. Each of first PSE 60 and second PSE 60 acts to detect PD 40 utilizing detection functionality 62 in cooperation with signature impedance 110 presented by PD interface 70. After detection, PSE 60 optionally presents a classification voltage to PD 40 utilizing classification functionality 64, and class current source 120 is arranged to drive a predetermined current indicative of the power requirements of PD load circuitry 90 responsive to the presented classification voltage, thus indicating to PSE 60 the power requirements thereof. The amount of current is detected by classification functionality 64. Optionally, PSE 60 further provides PD 40 with information regarding the powering ability of PSE 60 by providing a plurality of classification events separated by mark events, with the information provided by the number of classification events. The mark events function to define the individual classification events. A class event counter, if supplied, is arranged to count the classification events and output information regarding the counted classification events to PD load circuitry 90, thus providing PD load circuitry 90 with information regarding the powering ability of the PSEs 60.

Each PSE 60 is further arranged, in the event that sufficient power is available to support the power requirements detected and output by classification functionality 64, to provide operating power for PD 40 over the respective associated set of twisted wire pairs 30 of structured cable 35 by raising the voltage above the classification voltage range responsive to powering functionality 66. First and second diode bridges 65 are each arranged to ensure that power received by PD interface 70 and PD load circuitry 90 is at a predetermined polarity irrespective of the connection polarity of PSE 60. UVLO circuit 100 is arranged to maintain isolation between PSE 60 and PD load circuitry 90 until a predetermined operating voltage has been achieved across PD interface 70, and upon sensing the predetermined operating voltage UVLO circuit 100 is further arranged to assert output PG thus closing electronically controlled switch 80 thereby providing power to PD load circuitry 90. Optionally, a timer (not shown) may be provided to ensure that the startup phase is complete prior to closing electronically controlled switch 80.

The current provided to PD 40 by each PSE 60 flows back through sense resistor RS on the return path. Powering functionality 66 is arranged to enable current flow through NMOSFET CL responsive to master control 63 and detect the magnitude of the current flowing through sense resistor RS. In the event that the detected current magnitude is greater than, or equal to, the predetermined current value, powering functionality 66 is arranged to reduce the gate voltage of NMOSFET CL, thereby preventing the magnitude of the current flowing therethrough from exceeding the predetermined current value. Thus, powering functionality 66 controls the power provided to PD 40 according to the detected class thereof. MPS detection functionality 68 is arranged to monitor the current flow through sense resistor RS and to instruct control circuitry 61 to open NMOSFET CL in the event that the current falls below a predetermined minimum over a predetermined time window, thus ending the powering cycle.

FIG. 1C illustrates a high level block diagram of a PoE powering arrangement 200, according to the prior art, which is in all respects identical PoE powering arrangement 10 with the exception that a first and a second PD interface 70 are provided, first PD interface 70 is connected so as to presented to first PSE 60 in accordance with ALT-A powering and second PD interface 70 is connected so as to presented to second PSE 60 in accordance with ALT-B powering. The outputs of first and second PD interface 70, after the respective electronically controlled switch 80 are shown as being connected together, however that is not meant to be limiting in any way, and PD load circuitry 90 may be arranged to accept connections from each of first and second PD interfaces 70 without exceeding the scope.

PoE powering arrangements 10 and 200 each provide power over four twisted wire pairs to a high power PD, however the prior art does not provide for a method for determining as to whether PoE powering arrangement 10, or PoE powering arrangement 200 is provided. For example, in the detection phase, if a valid signature resistor is detected by each of first and second PSE 60, it may be powering arrangement 10 wherein a single PD interface 70 is provided, or powering arrangement 200 wherein separated PD interfaces 70 are provided for each of ALT-A and ALT-B.

SUMMARY OF THE INVENTION

Accordingly, it is a principal object of the present invention to overcome at least some of the disadvantages of prior art powering arrangements and PSE control. This is accomplished in one embodiment by a powering arrangement for powering a powered device over communication cabling, said powering arrangement comprising: a control circuitry; a first power sourcing equipment (PSE) having: a first output port arranged for connecting to the powered device over a first set of wires; a first detection power source arranged to generate a first detection power responsive to the control circuitry; a first power attribute detector arranged to detect a power attribute at the first output; and a first power enable circuit, and a second PSE having: a second output port arranged for connecting to the powered device over a second set of wires; a second detection power source arranged to generate a second detection power responsive to the control circuitry, said second detection power source having a greater amount of detection power than said first detection power source by at least a predetermined amount; a second power attribute detector arranged to detect a power attribute at the second output; and a second power enable circuit, wherein said control circuitry is arranged to: for a first time period, control said first detection power source to generate the first detection power and control said second detection power source to not generate said second detection power; during said first time period, obtain from said first power attribute detector a first indication of the power attribute at the first output; during a second time period, control said first detection power source to generate the first detection power and control said second detection power source to generate said second detection power; during said second time period, obtain from said first power attribute detector a second indication of the power attribute at the first output; determine a first difference between said first indication and said second indication; and control said first power enable circuit and said second power enable circuit to provide power to the powered device responsive to said determined first difference.

In one embodiment, each of said first and said second power attribute comprises a representation of one of a voltage value and a current magnitude.

In another embodiment said control circuitry is further arranged to: during said first time period, obtain from said second power attribute detector a third indication of the power attribute at the second output; during said second time period, obtain from said second power attribute detector a fourth indication of the power attribute at the second output; and determine a second difference between said third indication and said fourth indication, wherein said control of said first power enable circuit and said second power enable circuit to provide power is further responsive to said determined second difference between said third indication and said fourth indication.

In one further embodiment, said control circuitry is further arranged to: compare said determined first difference with a first predetermined threshold; compare said determined second difference with a second predetermined threshold; and in the event that said determined first difference is greater than said first predetermined threshold, and said determined second difference is greater than said second predetermined threshold, determine that the powered device presents two independent interfaces, wherein said control of said first power enable circuit and said second power enable circuit to provide power is responsive to said determination that the powered device presents two independent interfaces. In one yet further embodiment, said control of said first power enable circuit and said second power enable circuit to provide power responsive to said determination that the powered device presents two independent interfaces comprises: control of both said first PSE and said second PSE to perform classification.

In another further embodiment, in the event that said determined first difference is not greater than said first predetermined threshold, said control circuitry is further arranged to: compare said determined first difference with a third predetermined threshold; and in the event that said determined first difference is less than said third predetermined threshold, and said determined second difference is greater than said second predetermined threshold, determine that the powered device presents a single interface, wherein said control of said first power enable circuit and said second power enable circuit to provide power is responsive to said determination that the powered device presents a single interface. In one yet further embodiment said control of said first power enable circuit and said second power enable circuit responsive to said determination that the powered device presents the single interface comprises: control of only one of said first PSE and said second PSE to perform classification. In another yet further embodiment each of said first PSE and said second PSE comprise a respective maintain power signature detection functionality, and wherein said control of said first power enable circuit and said second power enable circuit to provide power responsive to said determination that the powered device presents the single interface comprises: disabling one of the maintain power signature detection functionality of the first PSE and the maintain power signature detection functionality of the second PSE.

Independently, a power over Ethernet (PoE) connection check method arranged to determine whether a powered device arranged to receive power over a first and a second set of wires presents a single interface or two interfaces is enabled, the method comprising: for a first time period, generating a first detection power over the first set of wires while not generating a second detection power over the second set of wires; during said first time period, obtaining a first indication of a power attribute over the first set of wires; during a second time period, generating the first detection power and generating a second detection power over the first set of wires, said second detection power greater than said first detection power by at least a predetermined amount; during said second time period, obtaining a second indication of the power attribute over the first set of wires; determining a first difference between said first indication and said second indication; and controlling a first power enable circuit associated with the first set of wires and a second power enable circuit associated with the second set of wires to provide power to the powered device over the first and second sets of wires responsive to said determined difference.

In one embodiment each of said first and said second obtained power attribute comprises a representation of one of a voltage value and a current magnitude.

In another embodiment, the method further comprises: during said first time period, obtaining a third indication of the power attribute over the second set of wires; during said second time period, obtaining a fourth indication of the power attribute over the second set of wires; and determining a second difference between said third indication and said fourth indication, wherein said controlling of said first power enable circuit and said second power enable circuit to provide power is further responsive to said determined second difference between said third indication and said fourth indication.

In one further embodiment, the method further comprises: comparing said determined first difference with a first predetermined threshold; comparing said determined second difference with a second predetermined threshold; and in the event that said determined first difference is greater than said first predetermined threshold, and said determined second difference is greater than said second predetermined threshold, determining that the powered device presents two independent interfaces, wherein said controlling of said first power enable circuit and said second power enable circuit to provide power is responsive to said determination that the powered device presents two independent interfaces. In one yet further embodiment, wherein said controlling of said first power enable circuit and said second power enable circuit responsive to said determination that the powered device presents two independent interfaces comprises: controlling each of said first power enable circuit and said second power enable circuit to perform classification.

In another further embodiment, wherein in the event that said determined first difference is not greater than said first predetermined threshold, comparing said determined first difference with a third predetermined threshold; and in the event that said determined first difference is less than said third predetermined threshold, and said determined second difference is greater than said second predetermined threshold, determining that the powered device presents a single interface, wherein said controlling of said first power enable circuit and said second power enable circuit to provide power is responsive to said determination that the powered device presents a single interface. In one yet further embodiment, said controlling of said first power enable circuit and said second power enable circuit responsive to said determination that the powered device presents the single interface comprises: controlling only one of said first power enable circuit and said second power enable circuit to perform classification. In one yet even further embodiment wherein each of said first PSE and said second PSE comprise a respective maintain power signature detection functionality, and wherein said control of said first power enable circuit and said second power enable circuit to provide power responsive to said determination that the powered device presents the single interface comprises: disabling one of a maintain power signature detection functionality of said first power enable circuit and a maintain power signature detection functionality of said second power enable circuit.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIGS. 2C-2D illustrate various embodiments of the PSE arrangement of

FIG. 2A, according to certain embodiments;

DETAILED DESCRIPTION OF THE PREFERRED EMBODIMENTS

Figure 1A:
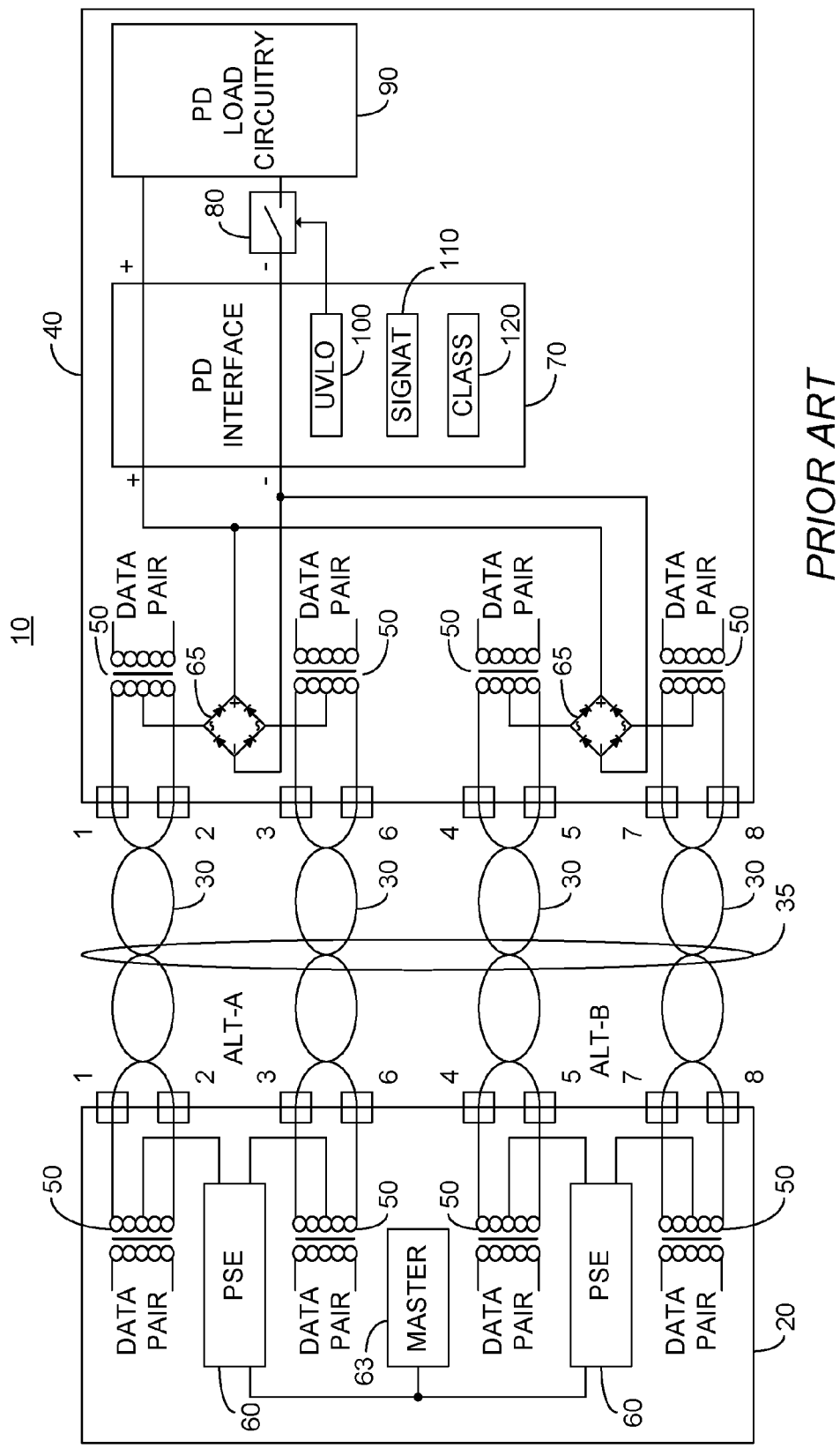
FIG. 1A illustrates a high level block diagram of a first PoE powering arrangement known to the prior art.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention is being described as an Ethernet based network, with a powered device being connected thereto. It is to be understood that the powered device is preferably an IEEE 802.3 compliant device preferably employing a 10Base-T, 100Base-T or 1000Base-T connection.

Figure 2A:
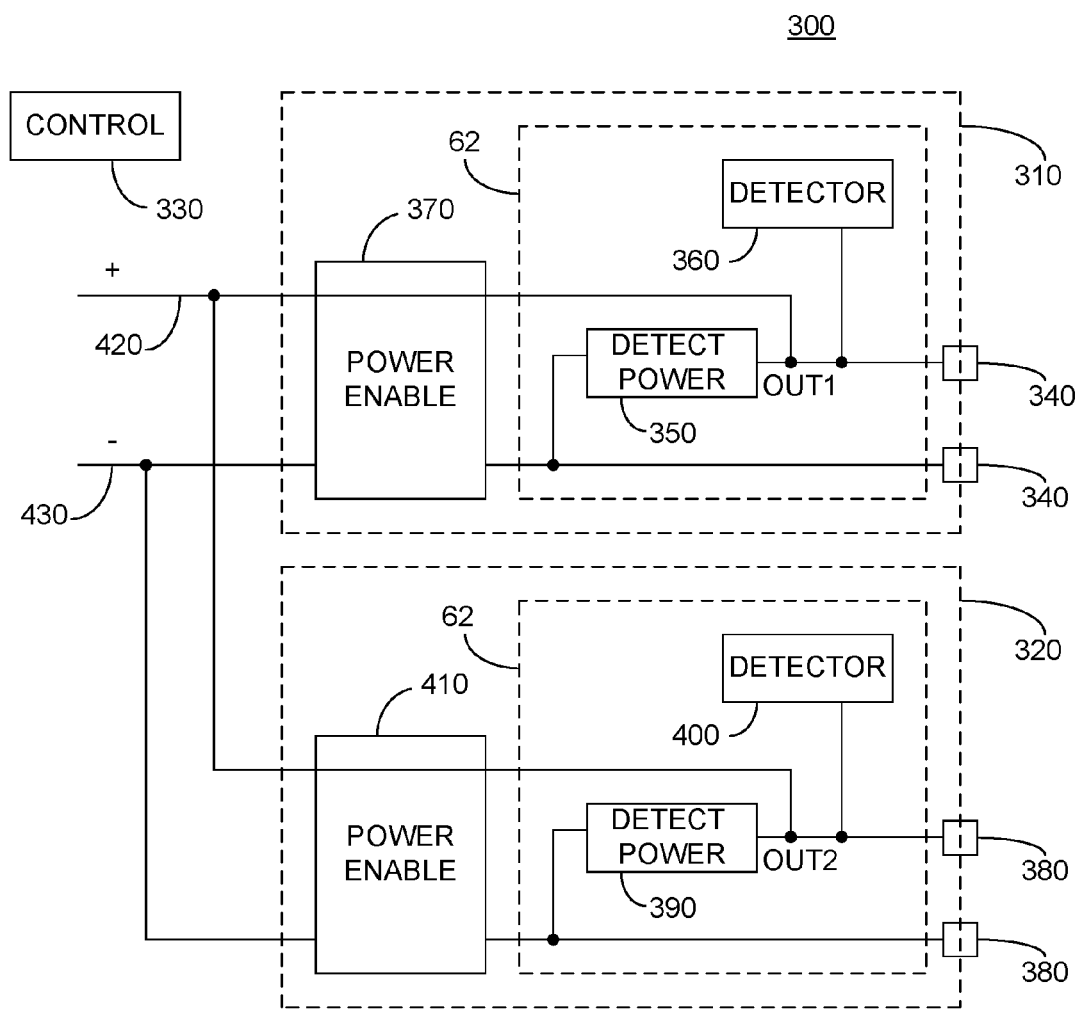
FIG. 2A illustrates a high level block diagram of a PSE arrangement, according to certain embodiments.
Figure 2B:
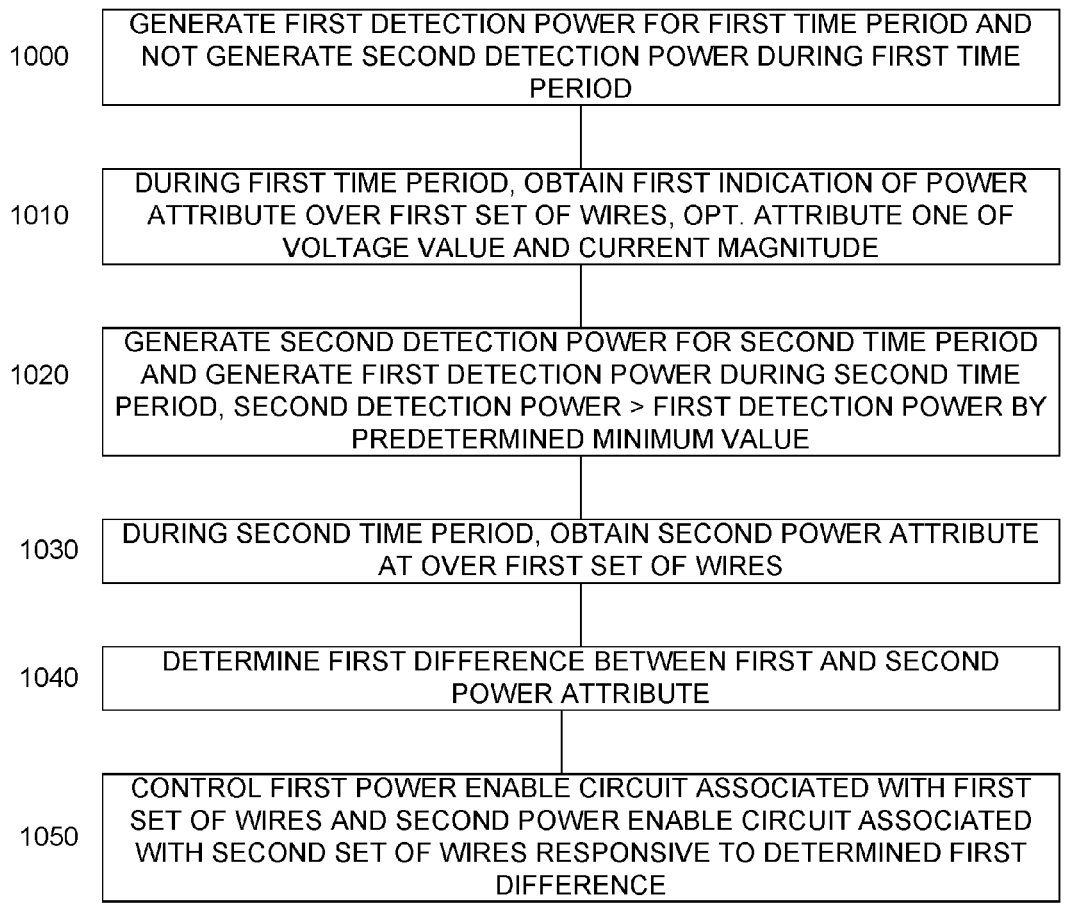
FIG. 2B illustrates a high level flow chart of a first method of PoE connection check, according to certain embodiments.
Figure 2C:
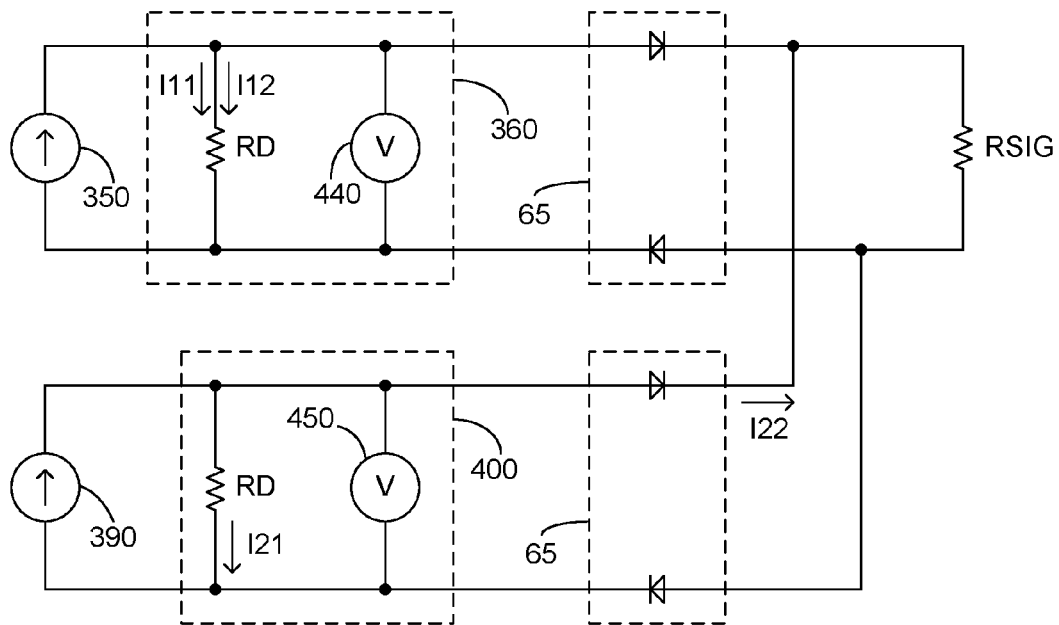
Figure 2D:
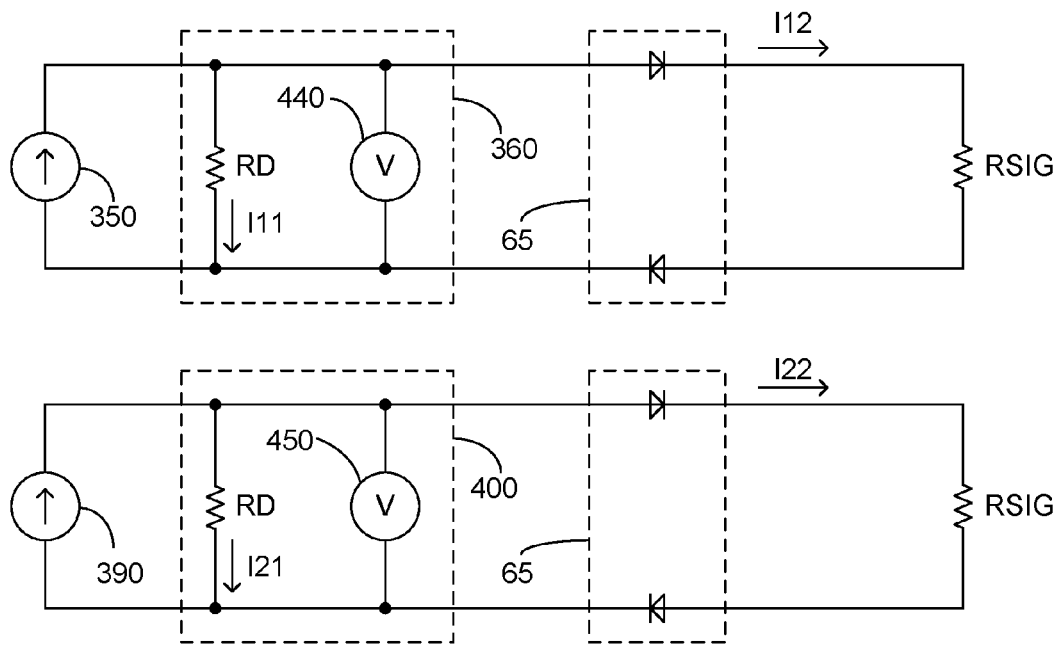

FIG. 2A illustrates a high level block diagram of a PSE arrangement 300 and FIG. 2B illustrates a high level block diagram of a first method of PoE detection. The method of FIG. 2B is described below as being implemented by PSE arrangement 300, however this is not meant to be limiting in any way. FIG. 2C illustrates the connection of PSE arrangement 300 in PoE powering arrangement 10, and FIG. 2D illustrates the connection of PSE arrangement 300 in PoE powering arrangement 200, FIGS. 2A-2D being described together. PSE arrangement 300 comprises: a first PSE 310; a second PSE 320; and a control circuitry 330. For simplicity only detection functionality 62 of each PSE 320, 330 is illustrated. First PSE 310 comprises: a pair of first outputs 340; a respective detection functionality 62 comprising a first detection power source 350 and a first power attribute detector 360; and a power enable circuit 370. Second PSE 320 comprises: a pair of second outputs 380; a respective detection functionality 62 comprising a second detection power source 390 and a second power attribute detector 400; and a power enable circuit 410. Power enable circuits 370, 410 each represent a respective powering functionality 66 in cooperation with current limiter CL and sense resistor RS and classification functionality 64. In one embodiment, as illustrated in FIGS. 2C-2D, first detection power source 350 and second detection power source 390 each comprises a current source. Additionally, first power attribute detector 360 and second power attribute detector 400 each comprise a voltage detector, denoted 440 and 450 respectively, in parallel with a resistor RD. In another embodiment, first detection power source 350 and second detection power source 390 each comprise a voltage source and in such an embodiment first power attribute detector 360 and second power attribute detector 400 each comprises a current magnitude detector. In one further embodiment, the current magnitude detector comprises a voltage detector arranged to detect the voltage drop across a sense resistor. Each of first detection power source 350, first power attribute detector 360, second detection power source 390, second detection power source 390 and the respective power enable circuit 370, 410 are in communication with control circuitry 330, and responsive thereto, the connections not shown for simplicity. Control circuitry 330 may be implanted as master control 63, or a combination of a local control circuit in communication with master control 63 without exceeding the scope.

Figure 1B:
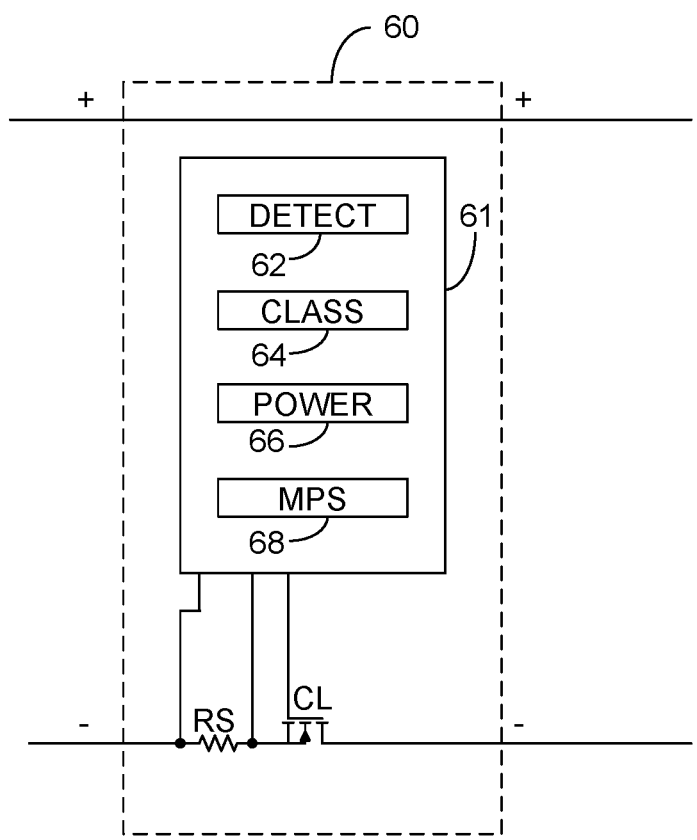
FIG. 1B illustrates a high level block diagram of an embodiment of a PSE known to the prior art.
Figure 1C:
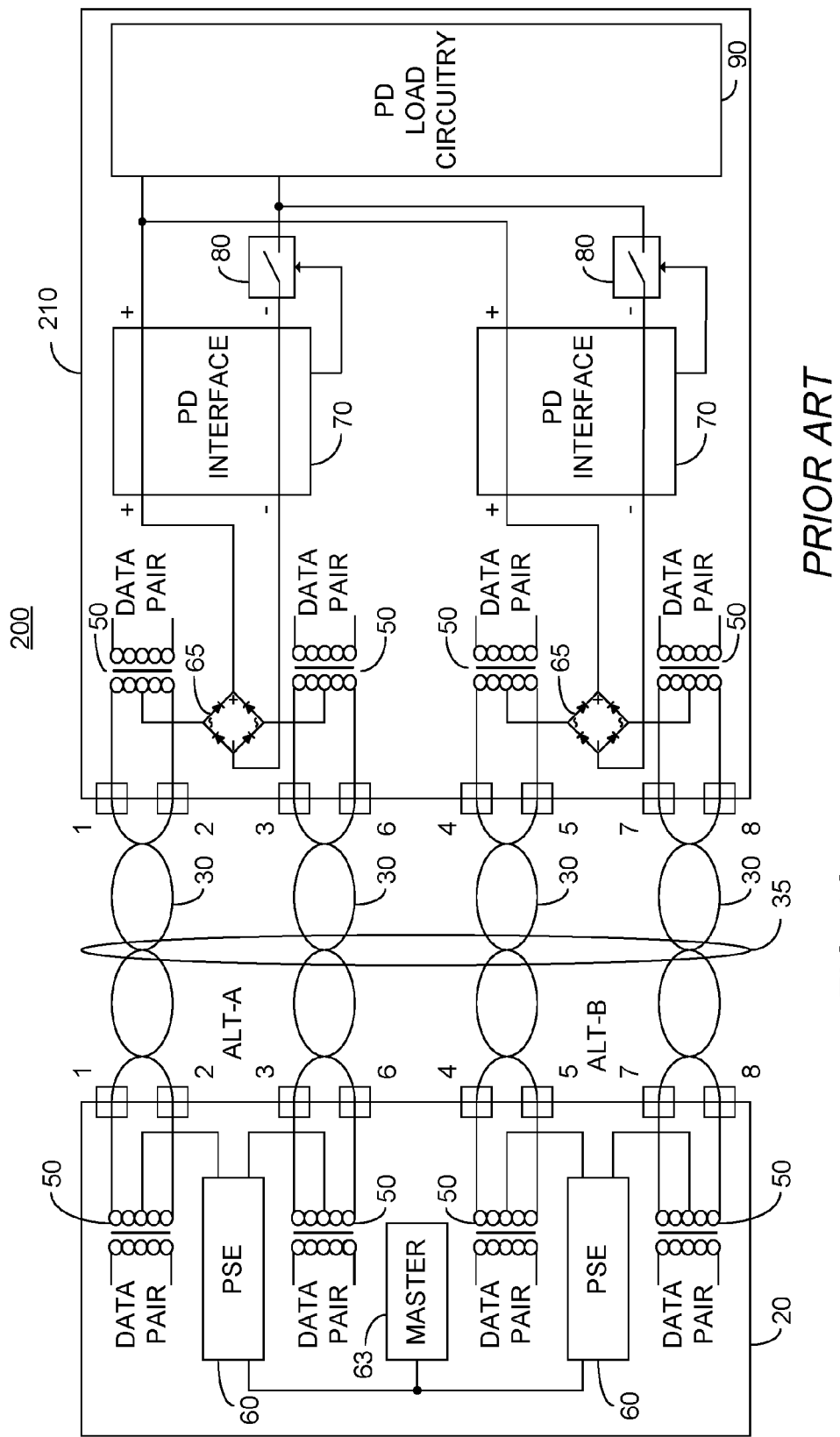
FIG. 1C illustrates a high level block diagram of a second PoE powering arrangement known to the prior art.

The output of first detection power source 350 is coupled to a first of pair of first outputs 340, the output denoted OUT1, and the return of first detection power source 350 is coupled to the second of pair of first outputs 340. First power attribute detector 360 is coupled to the output of first detection power source 350. The output of power enable circuit 370 is coupled to first output 340 and an input of power enable circuit 370 is coupled to a power line 420, optionally coupled to an external power source (not shown). In one embodiment, the output of power enable circuit 370 is directly coupled to power line 420 and NMOSFET CL and sense resistive element RS are coupled with a return line 430 of the external power source, return line 430 coupled to second output 340 as described above in relation to FIG. 1B.

The output of second detection power source 390 is coupled to a first of pair of second outputs 380, the output denoted OUT2, and the return of second detection power source 390 is coupled to the second of pair of second outputs 380. Second power attribute detector 400 is coupled to the output of second detection power source 390. The output of power enable circuit 410 is coupled to first output 380 and an input of power enable circuit 410 is coupled to power line 420. In one embodiment, the output of power enable circuit 410 is directly coupled to power line 420 and NMOSFET CL and sense resistive element RS are coupled with return line 430 as described above in relation to FIG. 1B.

Each of outputs 340 of first PSE 310 and outputs 380 of second PSE 320 is coupled to the secondary winding of a respective data transformer 50 (not shown) for connection over a respective set of wires to PD 40. Particularly, as described above in relation to PoE powering arrangements 10, 200 each data transformer 50 is coupled to a respective one of four twisted wire pairs, a pair of data transformers 50 coupled to the twisted wire pairs of ALT-A and a pair of data transformers 50 coupled to the twisted wire pairs of ALT-B. Outputs 340 of first PSE 310 are coupled to a first pair of data transformers 50 and outputs 380 of second PSE 320 are coupled to a second pair of data transformers 50.

In operation, in stage 1000 control circuitry 330 is arranged to control first detection power source 350 to generate a first detection power for a first predetermined time period. As described above, in one embodiment first detection power source 350 comprises a current source. In such an embodiment, the generated first detection power comprises a current exhibiting a predetermined magnitude. In another embodiment, as described above, first detection power source 350 comprises a voltage source. In such an embodiment, the generated first detection power comprises a voltage exhibiting a predetermined value. In one embodiment, the generated first detection power is in accordance with the requirements of IEEE 802.3af-2003, IEEE 802.3at-2009 and/or HDBaseT Specification Version 1.1.0, however this is not meant to be limiting in any way. Additionally, control circuitry 330 is arranged to control second detection power source 390 to not generate a detection power during the first predetermined time period.

The generated first detection power is output at outputs 340 of PSE 310 and is thus output over the respective twisted wire pairs. In the event that a PD is not coupled to the twisted wire pairs, the generated first detection power will not be output from PSE 310 and the entirety thereof will be detected by first power attribute detector 360. In the event that a PS is coupled to the twisted wire pairs, the generated first detection power will be split between first PSE 310 and the signature resistance of the PD. For example, in the embodiment where first detection power source 350 is a current source and first power attribute detector 360 comprises a respective voltage detector 440, 450, in parallel with a resistor RD, as illustrated in FIGS. 2C-2D, a first portion I11 of the generated current will flow through resistor RD of first power attribute detector 360 and a second portion I12 of the generated current will flow through signature resistance RSIG of the PD, thereby presenting a smaller voltage across resistor RD of first power attribute detector 360 than when no PD is present.

In stage 1010, during the first time period of stage 1000, i.e. when the generated first detection power is output at output OUT1 of first detection power source 350, control circuitry 330 is arranged to obtain from first power attribute detector 360 an indication of a first power attribute being delivered over the first set of wires. Optionally, the first power attribute is detected by first power attribute detector 360 at the output of first detection power source 350. Particularly, in the embodiment that first power attribute detector 360 comprises voltage detector 440 in parallel with resistor RD, the first power attribute is the value of the voltage across resistor RD generated by first portion I11 of the current output from first detection power source 350. As described above, in the event that a PD is not present, the entirety of the current output from first detection power source 350 flows through resistor RD of first power attribute detector 360. Optionally, the detection phase described above in relation to PoE arrangements 10 and 200 is performed and only in the event that a valid signature resistance is detected will stages 1010-1050 performed, as will be described further below.

In stage 1020, control circuitry 330 is arranged to control second detection power source 390 to generate a second detection power for a second predetermined time period. The first time period of stage 1000 is described herein as preceding the second time period of stage 1020, however this is not meant to be limiting in any way. In another embodiment, the generation of the second detection power, and subsequent stages described below, precede the generation of the first detection power of stage 1000, without exceeding the scope. During the second predetermined time period, control circuitry 330 is arranged to control first detection power source 350 to continue to generate the first detection power of stage 1000.

The generated second detection power is arranged to be greater than the generated first detection power of stage 100 by at least a predetermined amount. Particularly, in the embodiment where first detection power source 350 and second detection power source 390 each comprise a current source, as illustrated in FIGS. 2C-2D, optionally the magnitude of the current generated by second detection power source 390 is greater than the current generated by first detection power source 350 so as to be sufficient to be detected at the first set of wires. Alternatively, the values of the resistance values of resistors RD of first power attribute detector 360 and second power attribute detector 400 are arranged such that the voltage output at outputs 380 of second PSE 320 responsive to second detection power source 390 is greater than the voltage output at outputs 340 of first PSE 310 responsive to first detection power source 350 by a predetermined value, optionally at least 0.7 volts. In the embodiment wherein first detection power source 350 and second detection power source 390 each comprise a voltage source, the value of the voltage output by second detection power source 390 is arranged to be greater than the value of the voltage output by first detection power source 350 by a predetermined value, optionally at least 0.7 volts.

In one embodiment, the generated second detection power is in accordance with the requirements of IEEE 802.3af-2003, IEEE 802.3at-2009 and/or HDBaseT Specification Version 1.1.0, however this is not meant to be limiting in any way.

The generated second detection power is output at outputs 380 of PSE 320 and the generated first detection power is output at outputs 340 of PSE 310. The generated first and second detection powers are each thus output over the respective twisted wire pair sets. As described above in relation to PoE powering arrangement 10, in the event that a high power PD with a single PD interface 70 is coupled to the four twisted wire pairs, a diode bridge 65 will be presented to each of PSE 310, 320, the terminals of diode bridges 65 coupled to each other. As a result, the output second detection power of second PSE 320 will be presented at the output of diode bridge 65 associated with first PSE 310. Since the current, or voltage, of the second detection power is greater than the current, or voltage, of the first detection power, current will not flow from first PSE 310 to the respective diode bridge 65 because of the higher current, or voltage, blocking the output of the diode bridge 65. Particularly, in the embodiment illustrated in FIG. 2C, current portion I11 is less than current portion I21, thereby generating a smaller voltage across the respective resistor RD. The voltage generated by current portion I22 across signature resistance RSIG is greater than the voltage across resistor RD of first power attribute detector 360, thereby blocking current portion I12 from flowing towards the respective diode bridge 65. As a result, current portion I12 is added to current portion I11 flowing through resistor RD, thereby increasing the voltage thereacross. First detection power source 350 and second detection power source 390 are arranged such that the voltage across the respective resistor RD generated responsive to current portions I11 and I12 flowing therethrough is less than, or less than a voltage drop greater than, the voltage across signature resistance RSIG generated responsive to current portion I22 flowing therethrough.

In the event that a separate PD is presented to each of PSEs 310, 320, as illustrated in FIG. 2D, the current output by second detection power source 390 will have no effect on the current output by first detection power source 350. In such an event, current portion I12 will flow through the respective signature resistance RSIG and current portion I22 will flow through the respective signature resistance RSIG.

In stage 1030, during the second predetermined time period of stage 1020, i.e. when the generated first detection power is output at output OUT1 of first detection power source 350 and the generated second detection power is output at output OUT2 of second detection power source 390, control circuitry 330 is arranged to obtain from first power attribute detector 360 an indication of a second power attribute over the first set of wires. Particularly, in the embodiment that first power attribute detector 360 comprises voltage source 440 in parallel with the respective resistor RD, as illustrated in FIGS. 2C-2D, the second power attribute is the value of the voltage across resistor RD generated by the current flowing therethrough. As described above, in the event that a single PD interface 70 is present and coupled across four twisted wire pairs, as illustrated in FIG. 2C, the voltage across resistor RD of first power attribute detector 360 is generated by portions I11 and I12 of the current output from first detection power source 350. In the event that a separate PD interface 70 is presented to each of first and second PSEs 310, 320, as illustrated in FIG. 2D, the voltage across resistor RD of first power attribute detector 360 is generated only by current portion I11, as current portion I12 flows through the respective diode bridge 65 and signature resistance RSIG.

In stage 1040, control circuitry 330 is arranged to determine the difference between the received second power attribute indication of stage 1030 and the received first power attribute indication of stage 1010, the difference denoted the first difference. Optionally, the difference is determined as an absolute value.

As described further below, in certain embodiment control circuitry 330 is further arranged to compare the determined difference with a predetermined threshold. In the event that the determined difference is greater than the predetermined threshold, it is determined that a single PD interface 70 is connected over the four twisted wire pairs since the difference is caused by the effect of second PSE 320 on first PSE 310, i.e. there is a connection between them. In the event that the determined difference is not greater than the predetermined threshold, it is determined that separate PD interfaces 70 are connected over the twisted wire pairs since second PSE 320 does not affect first PSE 310.

In general the difference with between the first power attribute of stage 1010 and the second power attribute of stage 1030 is indicative as to whether a single PD interface 70 is presented by PD 40 or a pair of PD interfaces 70 are presented by PD 40.

In stage 1050, control circuitry 330 is arranged to control power enable circuit 370 to enable a first supply power and to control power enable circuit 410 to enable a second supply power. In one embodiment, as described above, the power enable circuit 370 comprises powering functionality 66 arranged to control an associated NMOSFET CL coupled between return line 430 and the respective one of outputs 340, 380. In another embodiment, power enable circuit 370 comprises powering functionality 66 arranged to control an associated current limiter coupled between power line 420 and the respective one of outputs 340, 380. Additionally, at least one of power enable circuit 370 and power enable circuit 410 are controlled in accordance with the determined first difference of stage 1040. In the event that it is determined in stage 1040 that a single PD interface 70 is connected to the four twisted wire pairs, optionally detection is performed only by one of first and second PSEs 310 and 320, as described above. As described above, in the event that it is determined in stage 1040 that two PD interfaces 70 are connected to the four twisted wire pairs, detection is performed by second PSE 320, in addition to the detection performed by first PSE 310.

In one embodiment, the control of stage 1050 comprises control of the classification stage. As described above in relation to PoE powering arrangement 10, optionally first and second PSEs 310 and 320 each comprise a classification functionality 64 arranged to determine the class of the PD interface 70 connected thereto, the classification functionality part of the respective power enable circuitry 370, 410. In the event that it is determined that a separate PD interface 70 is connected to each of first and second PSEs 310 and 320, classification is performed separately for each PD interface 70 and control circuitry 330 controls powering functionalities 62 of first and second PSE 310, 320 accordingly. Particularly, control circuitry 330 is arranged to determine if enough power is available to supply the requirements of the particular class of the PD interface 70 and only if enough power is available will the first and second supply powers by supplied. In the event that only a single PD interface is coupled over the four twisted wire pairs, classification is performed for the single PD interface 70 as a high powered device and the first and second supply powers are supplied responsive to the classification. Optionally, classification for a single high powered PD interface 70 is performed as described in U.S. Patent Application Publication S/N 2013/0257161 published Oct. 3, 2013, the entire contents of which is incorporated herein by reference.

In another embodiment, as will be described below in relation to FIGS. 4A-4B, in the event that a single PD interface 70 is determined to be connected and an imbalance is detected between ALT-A and ALT-B, a MPS functionality 68 is disabled at one of PSEs 310 and 320 by control circuitry 330. As a result, the supply power of the one of PSEs 310 and 320 whose MPS is disabled is still provided even if the power drawn therefrom by the PD is less than the MPS threshold.

Control circuitry 330 may be further arranged to utilize stage 1000 as part of a detection scheme, and as such since only a single level was generated in stage 1000, control circuitry 330 may enable at least one additional detection power from first detection power source 350 and receive from first power attribute detector 360 an indication of a respective power attribute at output OUT1 of first detection power source 350, in the absence of any output from second detection power source 390. Detection of a valid PD typically requires separately outputting two levels of detection power and detecting the power attribute for each power level. This allows for accurate measurement of signature resistance RSIG even though diode bridge 65 has an unknown effect on the measurement, since the effect of diode bridge 65 is constant between the two impressed power levels. Particularly, in the event that control circuitry 330 determines in stage 1040 that only a single PD interface 70 is coupled to the four twisted wire pairs, the PD is validated responsive to the detected first power attribute and an additional power attribute as described. Similarly, a plurality of levels are provided solely by second detection power source 390 and the respective associated power attributes obtained from second power attribute detector 400.

In one alternative embodiment, detection of a valid PD interface 70 is performed separately by each of first and second PSEs 310 and 320 prior to stages 1000-1050. In such an embodiment, only in the event that both first and second PSEs 310 and 320 detect a valid signature resistance RSIG are stages 1000-1050 performed. In another alternative embodiment, the detection stage is performed after the determination in stage 1050 if one or two PD interfaces 70 are connected. In the event that a single PD interface 70 is detected as connected, detection is performed by one of first PSE 310 and second PSE 320. In the event that two PD interfaces 70 are detected as connected, detection is performed by each of first and second PSEs 310 and 320 for the respective PD interface 70.

Figure 3:
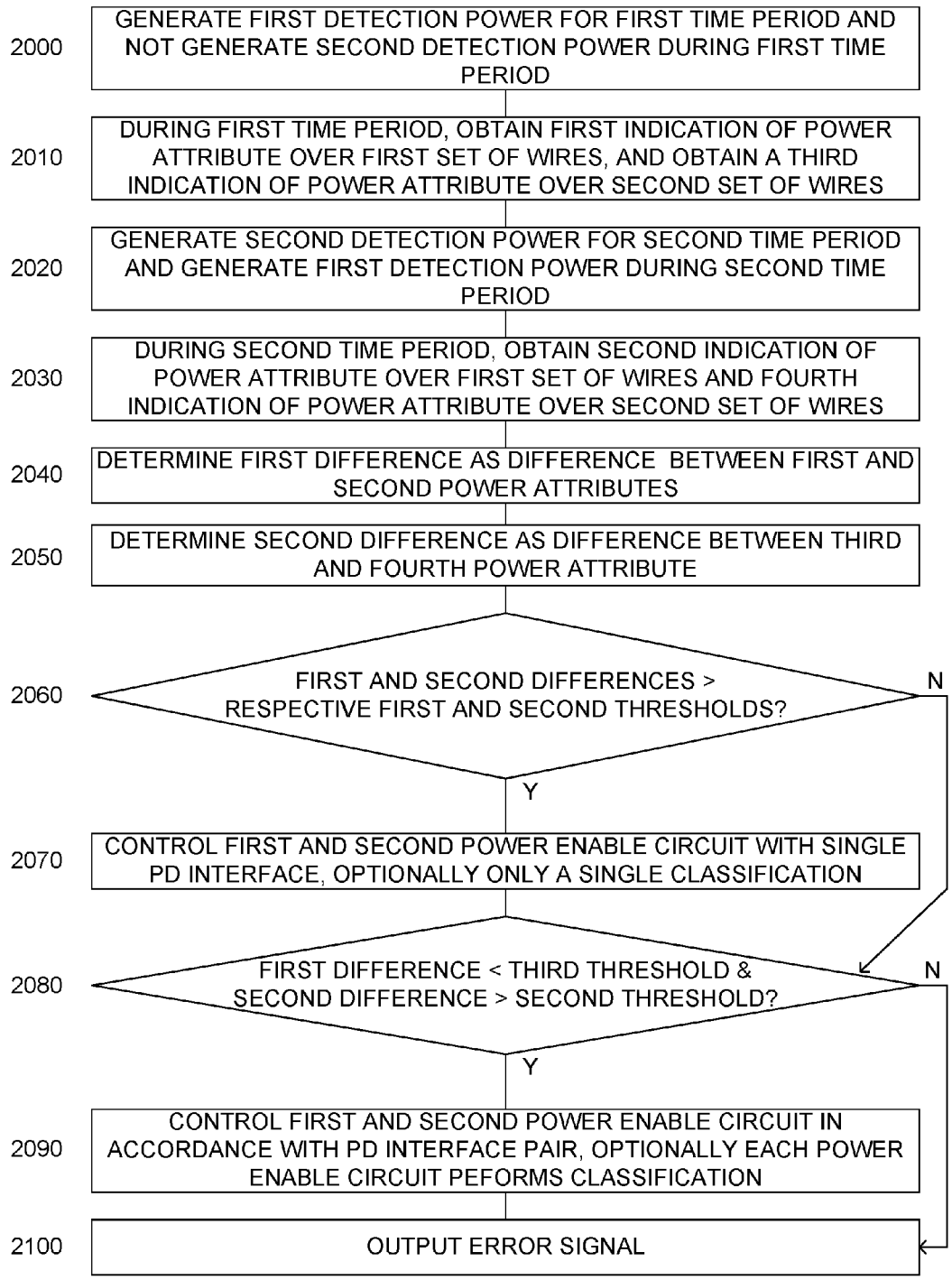
FIG. 3 illustrates a high level flow chart of a second method of PoE connection check, according to certain embodiments.

FIG. 3 illustrates a high level flow chart of a second method of PoE detection. The method of FIG. 3 is described as being implemented by PSE arrangement 300 of FIG. 2A, however this is not meant to be limiting in any way. In stage 2000, control circuitry 330 is arranged to control first detection power source 350 to generate a first detection power for a first predetermined time period and additionally control second detection power source 390 to not generate a second detection power, as described above in relation to stage 1000. In stage 2010, during the first time period of stage 2000, i.e. when the generated first detection power is output at output OUT1 of first detection power source 350, control circuitry 330 is arranged to obtain from first power attribute detector 360 an indication of a first power attribute over the first set of wires, optionally at the output of first detection power source 350, as described above in relation to stage 1010. Additionally, control circuitry 330 is arranged to receive from second power attribute detector 400 an indication of a third power attribute over the second set of wires, optionally at the output of second detection power source 360.

In stage 2020, control circuitry 330 is arranged to control second detection power source 390 to generate a second detection power for a second predetermined time period. As described above, the first time period of stage 2000 is described herein as preceding the second time period of stage 2020, however this is not meant to be limiting in any way. During the second predetermined time period, control circuitry 330 is arranged to control first detection power source 350 to continue to generate the first detection power of stage 2000. As described above, the generated second detection power is greater than the generated first detection power of stage 2000.

In stage 2030, during the second time period of stage 2020, i.e. when the generated first detection power is output at output OUT1 of first detection power source 350 and the generated second detection power is output at output OUT2 of second detection power source 390, control circuitry 330 is arranged to obtain from first power attribute detector 360 an indication of a second power attribute indication over the first set of wires, optionally at the output of first detection power source 350, as described above in relation to stage 1010. Additionally, control circuitry 330 is arranged to receive from second power attribute detector 400 an indication of a fourth power attribute over the second set of wires, optionally at the output of second detection power source 360.

In stage 2040, control circuitry 330 is arranged to determine the first difference between the received indication of the detected second power attribute at OUT1 of stage 2030 and the received indication of the detected first power attribute at OUT1 of stage 2010 as a first difference. In stage 2050, control circuitry 330 is arranged to determine the difference between the received indication of the detected fourth power attribute at OUT2 of stage 2030 and the received indication of the detected third power attribute at OUT2 of stage 2010 as a second difference.

In stage 2060 control circuitry 330 is further arranged to compare the determined first difference of stage 2040 with a first predetermined threshold and the determined second difference of stage 2050 with second predetermined threshold. In the event that the determined first and second differences are each greater than the respective one of the first and second predetermined thresholds, it is determined that a single PD interface 70 is connected over the four twisted wire pairs and stage 2070 is performed, as described below. As described above, the difference between the second power attribute and the first power attribute at OUT1 is caused by the effect of PSE 320 on PSE 310. Additionally, the third power attribute of stage 2010 should be zero, since no detection power is being output by second detection power source 390, and therefore there should be a significant difference between the third power attribute of stage 2010 and the fourth power attribute of stage 1030. A smaller difference, or no difference, would indicate that a short circuit exists which supplies power to second power attribute detector 400 from first detection power source 350. In stage 2070, control circuitry 330 is arranged to control first power enable circuit 370 and second power enable circuit 410 to each provide a respective supply power, in accordance with the determination that a single PD interface 70 is coupled to the four twisted wire pairs, as described above. Optionally, this includes only performing classification by one of first PSE 310 and second PSE 320.

In the event that in stage 2060 the first and second differences are not greater than the respective thresholds, in stage 2080 control circuitry 330 is arranged to determine whether the first determined difference is less than a third predetermined threshold, the third predetermined threshold less than the first predetermined threshold of stage 2060. In the event that the first determined difference is less than the third predetermined threshold, and the second determined difference is greater than the second predetermined threshold of stage 2060, as performed therein, in stage 2090 control circuitry 330 is arranged to control first power enable circuit 370 and second power enable circuit 410 to each provide a respective supply power, in accordance with the determination that a separate PD interface 70 is coupled to each of ALT-A and ALT-B. Optionally, this entails each of first power enable circuit 370 and second power enable circuit 410 performing classification Particularly, in the event that a separate PD interface is coupled to each of ALT-A and ALT-B, as described above in relation to FIG. 2D, there should be no significant difference between the first power attribute and the second power attribute since nothing should affect the detection. A significant difference between the first power attribute and the second power attribute would indicate that a short circuit exists which supplies power to first power attribute detector 360 from second detection power supply 390.

In the event that in stage 2080 the determined first difference is not less than the third threshold, and/or the second difference is not greater than the second threshold, in stage 2100 control circuitry 330 is arranged to control first power enable circuit 370 and second power enable circuit 410 to not provide the respective first supply power and second supply power. In one embodiment, control circuitry 330 is further arranged to output an error signal.

Figure 4A:
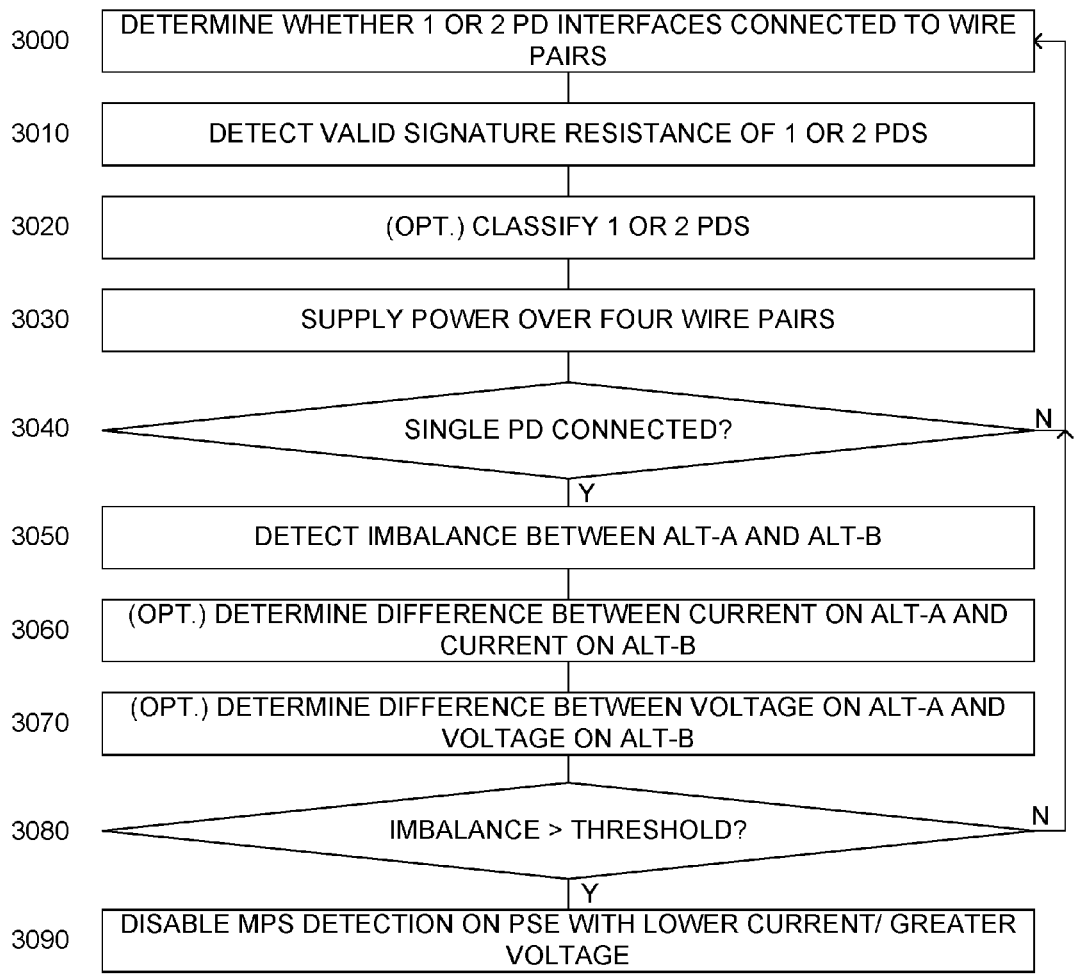
FIG. 4A illustrates a high level flow chart of a first method of PoE power monitoring, according to certain embodiments.

FIG. 4A illustrates a high level flow chart of a first method of PoE power monitoring performed by master control 63 of powering arrangements 10, 200. The method of FIG. 4A is described herein as being implemented by master control 63 of powering arrangements 10, 200, however this is not meant to be limiting in any way. In stage 3000, master control 63, or control circuitry 330, is arranged to determine whether 1 or 2 PD interfaces 70 are coupled to twisted wire pairs 30, as described above in relation to stages 1000-1050 of FIG. 2B and stages 2000-2080 of FIG. 3. In stage 3010, first and second PSEs 310 and 320 are arranged to detect a valid signature resistance of the 1 or 2 PD interfaces 70 connected to twisted wire pairs 30. As described above, in the event that only a single PD interface 70 is connected to twisted wire pairs 30 the detection may be performed by only one of first and second PSEs 310 and 320. In optional stage 3020, first and second PSEs 310 and 320 are arranged to perform classification of the 1 or 2 PD interfaces 70. In the event that 2 PD interfaces 70 are connected to twisted wire pairs 30, classification is performed as described above in relation to classification functionality 64. In the event that a single PD interface 70 is connected to twisted wire pairs 30, classification is performed by only a single one of first and second PSE 310, 320. In stage 3030, first and second PSE 310 and 320 are arranged to supply power over the four twisted wire pairs 30, as described above in relation to stage 1080.

In stage 3040, as described above in relation to stage 3000, control circuitry 330 is arranged to determine whether 1 or 2 PD interfaces 70 are connected to twisted wire pairs 30. In the event that control circuitry 330 determines that a single PD interface 70 is connected to twisted wire pairs 30, in stage 3050 control circuitry 330 is arranged to detect an imbalance between ALT-A and ALT-B. Particularly, as described above, the primary winding of each data transformer 50 of PD 40 is coupled to a respective one of pair of diode bridges 65. When a single PD interface 70 is coupled to twisted wire pairs 30, half the power drawn thereby is provided over ALT-A by first PSE 310 and the other half is provided over ALT-B by second PSE 320. The voltage drop of the diodes of diode bridges 65 are not exactly equal to each other, thereby causing an imbalance between the power provided over ALT-A and the power provided over ALT-B, i.e. the power provided over ALT-B is not exactly equal to the power provided over ALT-A. As described above, power is provided to PD circuitry 90 by the respective supply power sources 370 and 410 of first and second PSEs 310 and 320. As known to those skilled in the art at the time of the invention, PSEs 310 and 320 are each arrangement to monitor the power being provided thereby by a respective MPS functionality 68. In the event that less than a predetermined amount of power is being drawn from the respective PSE over a predetermined time window, MPS functionality is in communication with the powering functionality 66 to disconnect the power being provided to PD interface 70.

In optional stage 3060, the current flowing through twisted wire pairs 30 of ALT-A is measured by first PSE 310 and the current flowing through twisted wire pairs 30 of ALT-B is measured by second PSE 320. Control circuitry 330 is arranged to compare the measured current of ALT-A with the measured current of ALT-B and determine the difference therebetween. In optional stage 3070, the voltage at the output of first PSE 310 is measured by first PSE 310 and the voltage at the output of second PSE 320 is measured by second PSE 320. Control circuitry 330 is arranged to compare the measured voltage at the output of first PSE 310 with the measured voltage at the output of second PSE 320 and determine the difference therebetween. In stage 3080, control circuitry 330 is arranged compare the detected imbalance of stage 3050 to a predetermined imbalance threshold. In one embodiment, control circuitry 330 is arranged to compare the current difference of optional stage 1060 with the predetermined imbalance threshold. In another embodiment, control circuitry 330 is arranged to compare the voltage difference of optional stage 1070 with the predetermined imbalance threshold. In the event that the determined imbalance is greater than the predetermined threshold, control circuitry 330 is arranged to disable the MPS monitoring of the one of first and second PSEs 310, 320 associated with the diode bridge 65 exhibiting the lower voltage drop, i.e. the PSE exhibiting the lower current of optional stage 3060 or the higher voltage of optional stage 3070. If PD circuitry 90 draws a low current during operation, the low current is split between ALT-A and ALT-B, as described above. Due to the imbalance between ALT-A and ALT-B, the current associated with the diode bridge 65 exhibiting the lower voltage drop may be smaller than the MPS threshold and the respective one of PSEs 310 and 320 will shut down the power responsive to the respective MPS functionality 68. Advantageously, disabling the respective MPS functionality of the respective one of first and second PSEs 310, 320 avoids this problem. Since only a single PD interface 70 is connected to twisted wire pairs 30, the MPS needs to be monitored only on one of ALT-A and ALT-B.

In the event that in stage 3080 the detected imbalance of stage 3050 is less than the predetermined imbalance threshold, or in the event that in stage 3040 a pair of PD interfaces 70 are connected to twisted wire pairs 30, stage 3000 described above is again performed.

In an alternative embodiment, the MPS counter of each of first PSE 310 and second PSE 320 are monitored, the counter tracking time in the predetermined window for which under-current is detected. In the event that master control 63 notes that one counter is advancing and the other is not, master control 63 disabled the MPS functionality 68 of the PSE whose counter has been advancing. Thus, only the undisabled MPS functionality is operative. Optionally, the disabled MPS functionality 68 is again enabled in the event that the port current is detected as exceeding a pre-existing value, or a disconnect was actually detected, followed by a reconnect.

In an alternative embodiment, in stage 3090, the MPS threshold of one or more of the MPS functionalities 68 are reduced responsive to the imbalance. The reduction may be performed in steps of a predetermined size, or may be done responsive to the level of imbalance detected in stage 3050.

Figure 4B:
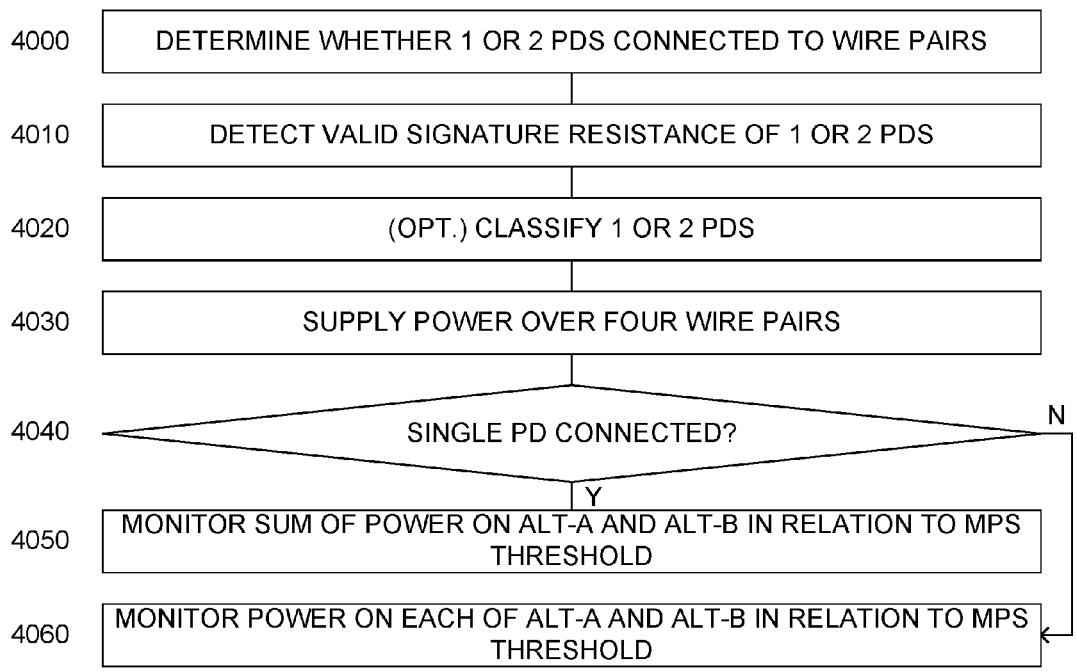
FIG. 4B illustrates a high level flow chart of a second method of PoE power monitoring, according to certain embodiments.

FIG. 4B illustrates a high level flow chart of a second method of PoE power monitoring. The method of FIG. 4B is described as being implemented by PoE powering arrangements 10, 200, however this is not meant to be limiting in any way. In stage 4000, control circuitry 330 is arranged to determine whether 1 or 2 PD interfaces 70 are coupled to twisted wire pairs 30, as described above in relation to stages 1000-1060 of FIG. 2B. In stage 4010, first and second PSEs 310, 320 are arranged to detect a valid signature resistance of the 1 or 2 PD interfaces 70 connected to twisted wire pairs 30. As described above, in the event that only a single PD interface 70 is connected to twisted wire pairs 30 the detection may be performed by only one of first and second PSEs 310 and 320. In optional stage 4020, PSEs 310 and 320 are arranged to perform classification of the 1 or 2 PD interfaces 70. In the event that 2 PD interfaces 70 are detected as connected to twisted wire pairs 30, classification is performed as described above in relation to classification functionality 64. In the event that a single PD interface 70 is connected to twisted wire pairs 30, classification if performed as described above in relation to stage 1080 of FIG. 2B. In stage 4030, first and second PSEs 310 and 320 are arranged to supply power over the four twisted wire pairs 30, as described above in relation to stage 1080.

In stage 4040, as described above in relation to stage 4000, control circuitry 330 is arranged to determine whether 1 or 2 PD interfaces 70 are connected to twisted wire pairs 30. In the event that control circuitry 330 determines that a single PD interface 70 is connected to twisted wire pairs 30, in stage 4050 control circuitry 330 is arranged to monitor the sum of the power output on ALT-A and the sum of power output on ALT-B. As described above in relation to stage 3050, first and second PSEs 310 and 320 are each arranged to monitor the amount of power being drawn by PD interface 70. Control circuitry 330 is arranged to sum the monitored powers of each of first and second PSE 310 and 520 and compare the summed powers to a predetermined MPS threshold, control circuitry 330 further arranged to control PSEs 310 and 320 to disable the power being supplied to PD interface 70 in the event that the sum of the powers on ALT-A and ALT-B is less than the predetermined MPS threshold. Advantageously, an imbalance between ALT-A and ALT-B, described above, won't affect the power monitoring because the sum of powers of ALT-A and ALT-B is being monitored. MPS functionality of each of first and second PSE 30, 320 is preferably disabled.

In the event that in stage 4040 control circuitry 530 determines that a separate PD interface 70 is coupled over each of ALT-A and ALT-B, first and second PSEs 310*m* 320 are each arranged to monitor the power supplied to the respective PD interface 70 via their respective MPS functionality 68 and shut down the power being supplied if the monitored power is less than a respective MPS threshold, as known to those skilled in the art at the time of the invention.

Figure 5A:
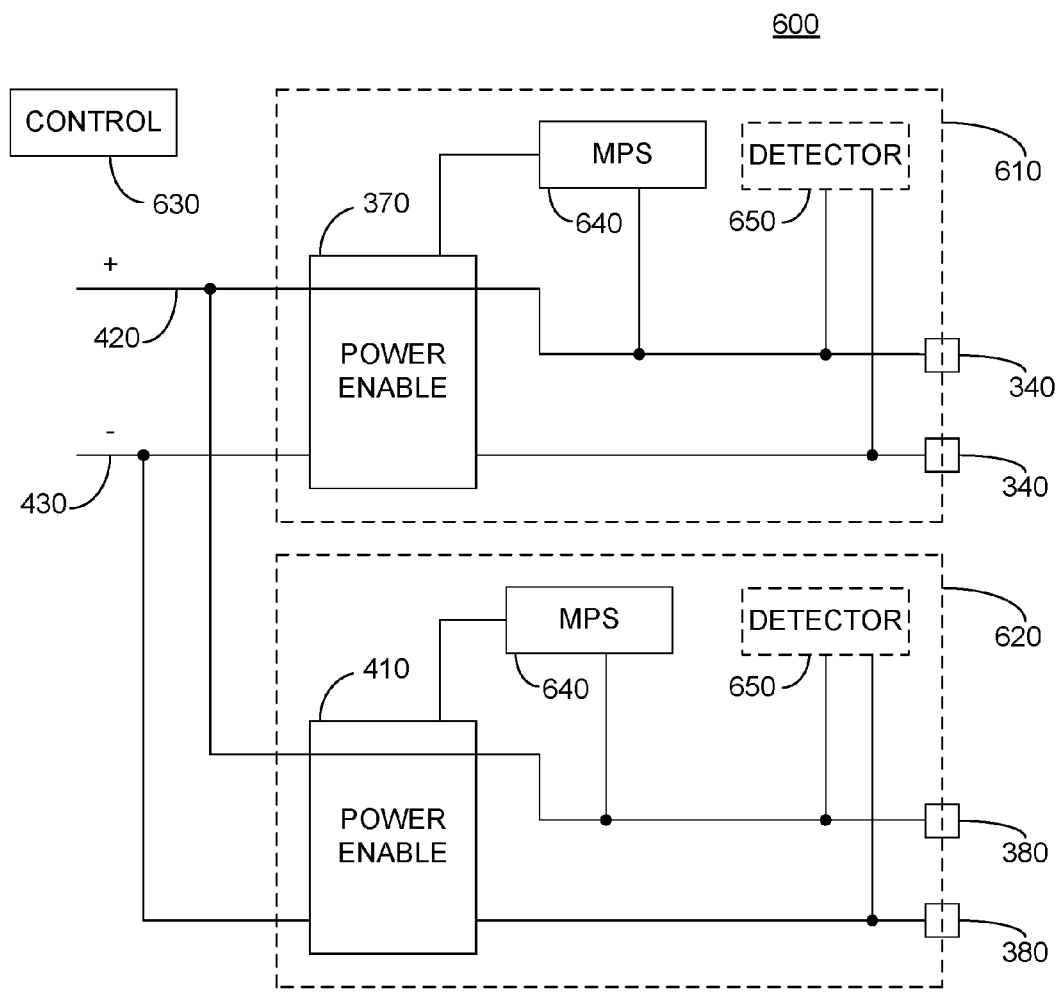
FIG. 5A illustrates a high level block diagram of a PoE power monitoring arrangement, according to certain embodiment.
Figure 5B:
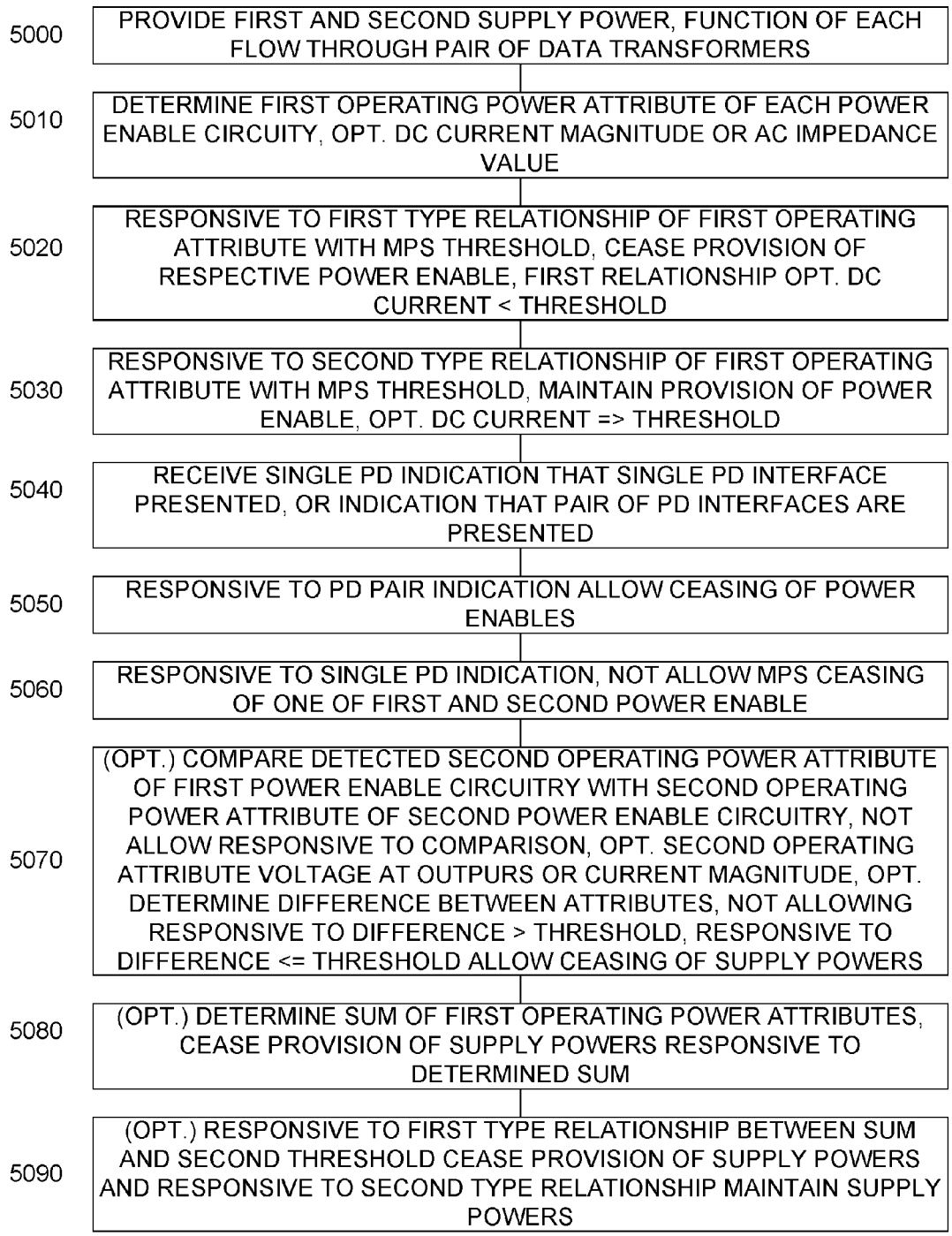
FIG. 5B illustrates a high level flow chart of a PoE power monitoring method, according to certain embodiments.

FIG. 5A illustrates a high level block diagram of PoE power monitoring arrangement 600. FIG. 5B illustrates a high level flow chart of a PoE power monitoring method. The PoE power monitoring method of FIG. 5B is described as being implemented by PoE power monitoring arrangement 600 of FIG. 5A, however this is not meant to be limiting in any way. PoE power monitoring arrangement 600 comprises: a first PSE 610; a second PSE 620; and a control circuitry 630. First PSE 610 comprises: a pair of outputs 340; a power enable circuit 370; an MPS functionality 640; and an optional power attribute detector 650. Second PSE 620 comprises: a pair of outputs 380; a power enable circuit 410; an MPS functionality 640; and an optional power attribute detector 650. MPS functionality 640 of each of first PSE 610 and second PSE 620 may be constituted in a dedicated circuitry, or as a programmed functionality for a computing element, without limitation.

MPS functionality 640 of each of first PSE 610 and second PSE 620 is coupled to a first of the respective pair of outputs 340 and 380, and is further coupled to the respective one of supply power sources 370 and 410. Optional power attribute detector 650 of each of first PSE 610 and second PSE 620 is coupled to the respective pair of outputs 340 and 380. The output of first power enable circuit 370 is coupled to first output 340 and an input of first power enable circuit 370 is coupled to a power line 420, optionally coupled to an external power source (not shown). In one embodiment, the output of first power enable circuit 370 is directly coupled to power line 420 and current limiter CL and sense resistive element RS are coupled within a return line 430 of the external power source, return line 430 coupled to second output 340. The output of second power enable circuit 410 is coupled to first output 380 and an input of second power enable circuit 410 is coupled to power line 410. In one embodiment, the output of second power enable circuit 410 is directly coupled to power line 420 and current limiter CL and sense resistive element RS are coupled within return line 430. Control circuitry 630 is in communication with each of first power enable circuit 370, second power enable circuit 410, MPS functionalities 640 and optional power attribute detectors 650, the connections not show for simplicity. First and second PSEs 610, 620 are described as comprising a respective power enable and an MPS functionality, however this is not meant to be limiting in any way and first and second PSEs 610, 620 preferably additionally comprise a detection functionality 62 and optionally a classification functionality 64, as described above in relation to PoE powering arrangement 10 of FIG. 1A. As described above, power enable 370, 410 preferably further comprise MPS functionality 640 and classification functionality 64.

Each of outputs 340 of first PSE 610 and outputs 380 of second PSE 620 is coupled to the secondary winding of a respective data transformer 50 (not shown). Particularly, as described above in relation to PoE powering arrangement 10, each data transformer 50 is coupled to a respective one of four twisted wire pairs, a pair of data transformers 50 coupled to the twisted wire pairs of ALT-A and a pair of data transformers 50 coupled to the twisted wire pairs of ALT-B. Outputs 340 of first PSE 610 are coupled to a first pair of data transformers 50 and outputs 380 of second PSE 620 are coupled to a second pair of data transformers 50.

In stage 5000, control circuitry 630 is arranged to control first power enable circuit 370 to provide a first supply power and control second power enable circuit 410 to provide a second supply power. As described above, the generation of the first and second supply powers are preceded by a detection, and optionally a classification, stage. In stage 5010, MPS functionality 640 of each of first PSE 610 and second PSE 620 is arranged to determine a first power attribute of the provided respective one of the first supply power and the second supply power. Optionally, the first power attribute comprises one of: a direct current (DC) current magnitude of the respective one of the first supply power and the second supply power; and an alternating current (AC) impedance value of the respective one of the first supply power and the second supply power. It is to be note, that imbalance is not detected by AC impedance detection.

In stage 5020, for each of first PSE 610 and second PSE 620, responsive to a first type relationship between the respective first type power attribute of stage 5010 and a predetermined MPS threshold, the respective MPS functionality 640 is arranged to control the respective one first power enable circuit 370 and second power enable circuit 410 to cease generation of the respective one of the first supply power and the second supply power. Optionally, in the embodiment where the first power attribute comprises a DC current magnitude, the first type relationship comprises the DC current magnitude being less than a predetermined MPS DC current magnitude threshold for a predetermined time period.

In stage 5030, for each of first PSE 610 and second PSE 620, responsive to a second type relationship between the respective first type power attribute of stage 5010 and the predetermined MPS threshold of stage 5020, the respective MPS functionality 640 is arranged to control the respective one first power enable circuit 370 and second power enable circuit 410 to maintain the generation of the respective one of the first supply power and the second supply power. Optionally, in the embodiment where the first power attribute comprises a DC current magnitude, the second type relationship comprises the DC current magnitude being greater than, or equal to, the predetermined MPS DC current magnitude threshold of stage 5020 for the predetermined time period.

In stage 5040, control circuitry 630 is arranged to receive one of a single PD interface indication and PD interface pair indication. The single PD interface indication is indicative that a single PD interface 70 is in electrical communication with pair of first outputs 340 of first PSE 610 and pair of second outputs 380 of second PSE 620, i.e. a single PD interface 70 is connected over the four twisted wire pairs. The PD pair indication is indicative that a first PD interface 70 is in electrical communication with pair of first outputs 340 of first PSE 610 and a second PD interface 70 is in electrical communication with pair of second outputs 380 of second PSE 620. In one embodiment, the single PD indication and PD pair indication are each generated in accordance with the method described above.

In stage 5050, responsive to a received PD interface pair indication of stage 5040, control circuitry 630 is arranged to allow MPS functionality 640 of each of first PSE 610 and second PSE 620 to control the respective one of first power enable circuit 370 and second power enable circuit 410 to cease generating the respective one of the first supply power and the second supply power. As described above in relation to stage 5020-5030, MPS functionality 640 is arranged to maintain or disable the respective supply power responsive to detection of a first power attribute of the respective supply power. In stage 5060, responsive to a received single PD interface indication of stage 5040, control circuitry 630 is arranged to not allow MPS functionality 640 of at least one of first PSE 610 and second PSE 620 to control the respective one of first power enable circuit 370 and second power enable circuit 410 to cease generating the respective one of the first supply power and the second supply power, i.e. the disabling function of MPS functionality 640.

In optional stage 5070, optional detector 650 of each of first PSE 610 and second PSE 620 is arranged to detect a second operating power attribute of the respective one of the first power enable circuit and the second power enable circuit. Control circuitry 630 is further arranged to compare the detected second operating power attributes. Responsive to the comparison, control circuitry 630 is arranged to not allow a respective one of MPS functionalities 640 to control the respective one of the first provided supply power and second provided supply power, as described above in relation to stage 5060. Optionally, the second operating power attribute is one of: the current magnitude flowing through the respective one of outputs 340 and outputs 380, i.e. the same as the first operating power attribute described above; and the voltage between outputs 340 or outputs 380, i.e. the voltage between the secondary windings of the respective data transformers 50. Optionally, control circuitry 630 is further arranged to determine the difference between the second operating power attribute of first PSE 610 and the second operating power attribute of second PSE 620. In the event that the determined difference is greater than a predetermined imbalance threshold, control circuitry 630 is arranged to not allow a respective one of MPS functionalities 640 to control the respective one of the first provided supply power and second provided supply power, as described above in relation to stage 3090 of FIG. 4A. In the event that the determined difference is less than, or equal to, the predetermined imbalance threshold, control circuitry 630 is arranged to allow both MPS functionality 640 to control the respective generated supply powers.

In optional stage 5080, control circuitry 630 is arranged to determine a sum of the detected first power attributes of stage 5010. Control circuitry 630 is arranged to control first power enable circuit 370 and second power enable circuit 410 to cease the provision of the first supply power and the second supply power, as described above in relation to stage 4050 of FIG. 4C. Advantageously, any imbalance is compensated for by summing the two supply powers together to determine if the PD circuitry 90 is drawing power. In optional stage 5090, responsive to a first type relationship between the determined sum of optional stage 5080 and a second MPS threshold, control circuitry 630 is arranged to control first power enable circuit 370 and second power enable circuit 410 to cease the generation of the first supply power and the second supply power. Responsive to a second type relationship between the determined sum of optional stage 5080 and the second MPS threshold, control circuitry 630 is arranged to control first power enable circuit 370 and second power enable circuit 410 to maintain the generation of the first supply power and the second supply power, the second type relationship opposing the first type relationship. As described above in relation to stage 5020, optionally in the embodiment where the first power attribute comprises a DC current magnitude, the first type relationship comprises the DC current magnitude being less than a predetermined MPS DC current magnitude threshold over a predetermined time period.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A powering arrangement for powering a powered device over communication cabling, said powering arrangement comprising:
a control circuitry;
a first power sourcing equipment (PSE) having:
 a first output port arranged for connecting to the powered device over a first set of wires;
 a first detection power source arranged to generate a first detection power responsive to the control circuitry;
 a first power attribute detector arranged to detect a power attribute at the first output; and
 a first power enable circuit, and
a second PSE having:
 a second output port arranged for connecting to the powered device over a second set of wires;
 a second detection power source arranged to generate a second detection power responsive to the control circuitry, said second detection power source having a greater amount of detection power than said first detection power source by at least a predetermined amount;
 a second power attribute detector arranged to detect a power attribute at the second output; and
 a second power enable circuit,
wherein said control circuitry is arranged to:
 for a first time period, control said first detection power source to generate the first detection power and control said second detection power source to not generate said second detection power;
 during said first time period, obtain from said first power attribute detector a first indication of the power attribute at the first output;
 during a second time period, control said first detection power source to generate the first detection power and control said second detection power source to generate said second detection power;
 during said second time period, obtain from said first power attribute detector a second indication of the power attribute at the first output;
 determine a first difference between said first indication and said second indication; and
 control said first power enable circuit and said second power enable circuit to provide power to the powered device responsive to said determined first difference.

2. The powering arrangement of claim 1, wherein each of said first and said second power attribute comprises a representation of one of a voltage value and a current magnitude.

3. The powering arrangement of claim 1, wherein said control circuitry is further arranged to:
during said first time period, obtain from said second power attribute detector a third indication of the power attribute at the second output;
during said second time period, obtain from said second power attribute detector a fourth indication of the power attribute at the second output; and
determine a second difference between said third indication and said fourth indication,
wherein said control of said first power enable circuit and said second power enable circuit to provide power is further responsive to said determined second difference between said third indication and said fourth indication.

4. The powering arrangement of claim 3, wherein said control circuitry is further arranged to:
compare said determined first difference with a first predetermined threshold;
compare said determined second difference with a second predetermined threshold; and
in the event that said determined first difference is greater than said first predetermined threshold, and said determined second difference is greater than said second predetermined threshold, determine that the powered device presents two independent interfaces,
wherein said control of said first power enable circuit and said second power enable circuit to provide power is responsive to said determination that the powered device presents two independent interfaces.

5. The powering arrangement of claim 4, wherein said control of said first power enable circuit and said second power enable circuit to provide power responsive to said determination that the powered device presents two independent interfaces comprises:
control of both said first PSE and said second PSE to perform classification.

6. The powering arrangement of claim 3, wherein in the event that said determined first difference is not greater than said first predetermined threshold, said control circuitry is further arranged to:
compare said determined first difference with a third predetermined threshold; and
in the event that said determined first difference is less than said third predetermined threshold, and said determined second difference is greater than said second predetermined threshold, determine that the powered device presents a single interface,
wherein said control of said first power enable circuit and said second power enable circuit to provide power is responsive to said determination that the powered device presents a single interface.

7. The powering arrangement of claim 6, wherein said control of said first power enable circuit and said second power enable circuit responsive to said determination that the powered device presents the single interface comprises:
control of only one of said first PSE and said second PSE to perform classification.

8. The powering arrangement of claim 6, wherein each of said first PSE and said second PSE comprise a respective maintain power signature detection functionality, and wherein said control of said first power enable circuit and said second power enable circuit to provide power responsive to said determination that the powered device presents the single interface comprises:
disabling one of the maintain power signature detection functionality of the first PSE and the maintain power signature detection functionality of the second PSE.

9. A power over Ethernet (PoE) connection check method arranged to determine whether a powered device arranged to receive power over a first and a second set of wires presents a single interface or two interfaces, the method comprising:
for a first time period, generating a first detection power over the first set of wires while not generating a second detection power over the second set of wires;
during said first time period, obtaining a first indication of a power attribute over the first set of wires;
during a second time period, generating the first detection power and generating a second detection power over the first set of wires, said second detection power greater than said first detection power by at least a predetermined amount;
during said second time period, obtaining a second indication of the power attribute over the first set of wires;
determining a first difference between said first indication and said second indication; and
controlling a first power enable circuit associated with the first set of wires and a second power enable circuit associated with the second set of wires to provide power to the powered device over the first and second sets of wires responsive to said determined difference.

10. The method according to claim 9, wherein each of said first and said second obtained power attribute comprises a representation of one of a voltage value and a current magnitude.

11. The method according to claim 9, further comprising:
during said first time period, obtaining a third indication of the power attribute over the second set of wires;
during said second time period, obtaining a fourth indication of the power attribute over the second set of wires; and
determining a second difference between said third indication and said fourth indication,
wherein said controlling of said first power enable circuit and said second power enable circuit to provide power is further responsive to said determined second difference between said third indication and said fourth indication.

12. The method according to claim 11, further comprising:
comparing said determined first difference with a first predetermined threshold;
comparing said determined second difference with a second predetermined threshold; and
in the event that said determined first difference is greater than said first predetermined threshold, and said determined second difference is greater than said second predetermined threshold, determining that the powered device presents two independent interfaces,
wherein said controlling of said first power enable circuit and said second power enable circuit to provide power is responsive to said determination that the powered device presents two independent interfaces.

13. The method according to claim 12, wherein said controlling of said first power enable circuit and said second power enable circuit responsive to said determination that the powered device presents two independent interfaces comprises:
controlling each of said first power enable circuit and said second power enable circuit to perform classification.

14. The method according to claim 11, wherein in the event that said determined first difference is not greater than said first predetermined threshold,
comparing said determined first difference with a third predetermined threshold; and
in the event that said determined first difference is less than said third predetermined threshold, and said determined second difference is greater than said second predetermined threshold, determining that the powered device presents a single interface,
wherein said controlling of said first power enable circuit and said second power enable circuit to provide power is responsive to said determination that the powered device presents a single interface.

15. The method according to claim 14, wherein said controlling of said first power enable circuit and said second power enable circuit responsive to said determination that the powered device presents the single interface comprises:
controlling only one of said first power enable circuit and said second power enable circuit to perform classification.

16. The method according to claim 14, wherein said control of said first power enable circuit and said second power enable circuit to provide power responsive to said determination that the powered device presents the single interface comprises: disabling one of a maintain power signature detection functionality of said first power enable circuit and a maintain power signature detection functionality of said second power enable circuit.

* * * * *